(12) United States Patent
Teschner et al.

(10) Patent No.: US 9,115,780 B2
(45) Date of Patent: Aug. 25, 2015

(54) PULSATION DAMPER

(71) Applicant: MANN+HUMMEL GMBH, Ludwigsburg (DE)

(72) Inventors: Matthias Teschner, Ludwigsburg (DE); Panagiotis Giagounidis, Markgroeningen (DE); Helge Krempels, Ludwigsburg (DE); Siegfried Herkommer, Mundelsheim (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 0 days.

(21) Appl. No.: 14/152,214

(22) Filed: Jan. 10, 2014

(65) Prior Publication Data

US 2014/0196979 A1 Jul. 17, 2014

(30) Foreign Application Priority Data

Jan. 11, 2013 (DE) .......................... 10 2013 000 338

(51) Int. Cl.
*F16F 9/44* (2006.01)
*F16L 55/04* (2006.01)

(52) U.S. Cl.
CPC ..... *F16F 9/44* (2013.01); *F16L 55/041* (2013.01)

(58) Field of Classification Search
CPC .......... F16L 55/041; F16F 9/44; F15B 21/008
See application file for complete search history.

(56) References Cited

U.S. PATENT DOCUMENTS

| 4,473,043 | A | * | 9/1984 | Furukawa et al. | ...... 123/196 AB |
| 4,998,609 | A | * | 3/1991 | Nix et al. | ...... 192/109 F |
| 2006/0196741 | A1 | * | 9/2006 | Kindblom | ...... 188/318 |
| 2009/0308062 | A1 | * | 12/2009 | Bootz et al. | ...... 60/327 |
| 2010/0048340 | A1 | * | 2/2010 | Nakamura | ...... 475/129 |
| 2010/0288388 | A1 | * | 11/2010 | Barale et al. | ...... 138/31 |

FOREIGN PATENT DOCUMENTS

| DE | 2117105 A1 | 10/1972 | |
| DE | 10006542 A1 | 8/2000 | |
| DE | 102010050928 A1 | 5/2012 | |
| WO | WO 03019025 A1 * | 3/2003 | ............ F16D 25/08 |

* cited by examiner

*Primary Examiner* — Jeremy Luks
(74) *Attorney, Agent, or Firm* — James Hasselbeck

(57) ABSTRACT

A pulsation damper (1) for damping pressure pulsations of a fluid is insertable into the fluid line as intermediate piece by forming an axial flow channel (3), and the pulsation damper (1) featuring a housing (2). The pulsation damper (1) is characterized by the fact that the housing (2) has at least one hollow space (23) communicating with the flow channel (3) and in which at least one attenuator (4) is disposed movably in axial direction.

11 Claims, 3 Drawing Sheets

PULSATION DAMPER

CROSS REFERENCE TO RELATED APPLICATIONS

This application claims the benefit under 35 USC 119 of foreign application DE 10 2013 000 338.5 filed in Germany on Jan. 11, 2013, and which is hereby incorporated by reference in its entirety.

TECHNICAL FIELD

The invention relates to a pulsation damper for damping pressure pulsations of a fluid in a fluid line, wherein the pulsation damper is insertable into the fluid line as intermediate piece by forming an axial flow channel, and wherein the pulsation damper features a housing. The pulsation damper is especially suitable for being used in an engine oil circuit of an internal combustion engine, in particular of a motor vehicle.

BACKGROUND OF THE INVENTION

Pumps are often used to convey fluids. In this connection, many fluid pumps, for example vane pumps, generate in particular no constant volume flow at high speeds, but a time-varying volume flow with periodically occurring pressure pulsations. Such pressure peaks can damage components disposed downstream of the pump. This problem exists, for example, in industrial process plants or also in fluid circuits of internal combustion engines, for example in an engine oil circuit of an internal combustion engine, in particular of a motor vehicle.

To reduce pressure pulsations, different pulsation dampers are known from the back-ground art, for example absorption dampers, electrically operated active dampers or reflection dampers and interference dampers, respectively. An interference damper in the shape of a series resonator is, for example, described in the patent application DE 10 2010 050 928 A1. Interference dampers with series resonators feature one or more resonators which are introduced into the fluid-guiding line in such a way that at least one cross-sectional jump is generated. Because of this, pressure pulses are reflected and damping is realized by destructive interference between the reflected pressure pulses and the subsequent pressure pulses. However, a cross-sectional jump in the fluid-guiding line comes always along with a pressure loss.

SUMMARY OF THE INVENTION

An objective of the invention is to specify a pulsation damper which reliably dampens pressure pulsations of a fluid without causing a pressure loss. Furthermore, a corresponding method for pulsation damping and an oil module with a corresponding pulsation damper is disclosed.

The objective is solved for a pulsation damper of the above-mentioned type by the fact that the housing has at least one hollow space communicating with the flow channel and in which at least one attenuator is disposed movably in axial direction. In this connection, the attenuator is movable in a purely mechanical way by the pressure pulsations. The supply of electrical energy is not required. Because of this, the pulsation damper operates very reliably and cost-efficiently. By moving the attenuator, mechanical work is performed and hydraulic energy is transformed into kinetic energy. As the volume flow is constant, the reduction of the hydraulic energy comes along with a reduction of the pressure. Thus, the pressure pulsations are dampened. Due to the movable attenuator, it could also be called a dynamic pulsation damper or a dynamic pressure peak damper.

The length of the attenuator in axial direction may be smaller than a length of the hollow space in such a way that a gap between the housing and the attenuator is generated in axial direction. When the attenuator is in a rest position, a first gap may be located upstream in axial direction and a second gap may be located downstream of the attenuator. The attenuator can have any shape, it has, however, always an end face directed upstream and downstream onto which the fluid pressure can act. If a pressure pulse occurs, the pressure differential between first gap and second gaps causes an axial displacement of the attenuator in flow direction. The first gap and the second gap preferably feature a width which exceeds a moving path of the attenuator at least two times, preferably five times. The gap width is in each case may preferably be at most a few millimeters, particularly preferred at most 1 mm. The gap widths can be chosen in such a way that the attenuator is not prevented from moving axially, i.e. the sum of the gap widths is bigger than the moving path of the attenuator. In this way, an optimal damping effect can be realized.

In an advantageous embodiment, an external diameter of the attenuator is at least sectionwise substantially equal to an internal diameter of the hollow space. Because of this, the formation of a bypass of the flow channel is prevented which would lead to a pressure compensation in the flow channel and impair a damping. The external diameter of the attenuator can only sectionwise, for example only at one place, substantially be equal to an internal diameter of the hollow space or over the whole length. A substantially equal diameter means in this case that, on the one hand, there is no form fit so that the attenuator is movable inside of the hollow space in axial direction and that, on the other hand, there is a smallest possible radial clearance so that the formation of a gap is prevented which would act as bypass for the fluid.

The hollow space and the attenuator can enclose the flow channel coaxially. The hollow space is, for example, cylindrical or cuboid-shaped. The attenuator is then designed accordingly either as cylinder or as cuboid and features along its central axis a cylindrical recess which forms the flow channel.

The attenuator can contribute to form the flow channel. The flow channel can feature a substantially constant cross-section. A constant cross-section offers the advantage that no pressure losses due to cross-sectional jumps occur.

The attenuator can be made of a material with high density, in particular metal, preferably steel.

Advantageously, a resilient element, in particular a spring-loaded element, can be provided which exerts on the attenuator a force in axial direction in upstream direction of the fluid. The spring-loaded element can be any compression spring which can be disposed at or integrally molded to the housing or the attenuator. The attenuator can also be made at least sectionwise of a resilient or spring-loaded material.

Advantageously, a spacer can be provided in the hollow space which defines the minimum width of a gap between the attenuator and a wall limiting the hollow space in axial upstream direction. The spacer ensures that there is always a gap between the attenuator and the housing. Because of this it is ensured, that the pressure pulsations can exert a force on the attenuator and that thus a reliable displacement of the attenuator takes place. Particularly advantageously is a spacer disposed upstream in combination with a resilient element disposed downstream. The spacer can be part of the housing or the attenuator or it can be a separate component.

The hollow space and the attenuator can feature a first section with a first external diameter and a second section with a second external diameter, wherein the second section is disposed downstream of the first section and wherein the second external diameter is smaller than the first external diameter. Because of this, two gaps, of which only one communicates with the flow channel, are formed downstream of the attenuator. The end face in relation to this gap can be called active surface, as the fluid pressure acts on it. The upstream directed end face of the attenuator and the downstream active surface feature different cross-sectional areas. Because of this, the damping effect can be increased. The width of the two gaps formed downstream can be equal. In the gap, which is not connected with the flow channel, the resilient element can be disposed advantageously.

The attenuator can consist of at least two segments which are introduced in axial direction one after the other into the hollow space. There is a gap-free connection between the individual segments. The attenuator can consist of only one segment as well.

The objective is furthermore solved by an oil module for the introduction into an oil-circulation system of an internal combustion engine, in particular of a motor vehicle, with at least one oil filter, wherein at least one pulsation damper according to the invention is integrated into the oil module. The pulsation damper is insertable as intermediate piece into the oil-guiding line and forms an axial flow channel. The pulsation damper features a housing which has at least one hollow space communicating with the flow channel and in which at least one attenuator is disposed movably in axial direction. Advantageous embodiments of the pulsation damper have already been specified and are also valid in connection with the oil module.

The objective is furthermore solved by a method for damping pressure pulsations of a fluid in a fluid line, wherein a movable attenuator is introduced into the fluid in such a way that the hydraulic energy is transformed into kinetic energy and the kinetic energy into dissipation energy. The dissipation energy is no more available for the fluid as hydraulic energy. With a constant volume flow, the pressure is thus reduced and the pressure peaks dampened, respectively. Advantageously, the attenuator is introduced into a housing which is introduced into the fluid line as intermediate piece by forming a flow channel for the fluid. Advantageously, the attenuator is disposed in such a way that it is shifted by a pressure pulse from a first position into a second position. Preferably, the attenuator is moved again into its initial position before a subsequent pulse.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1A:
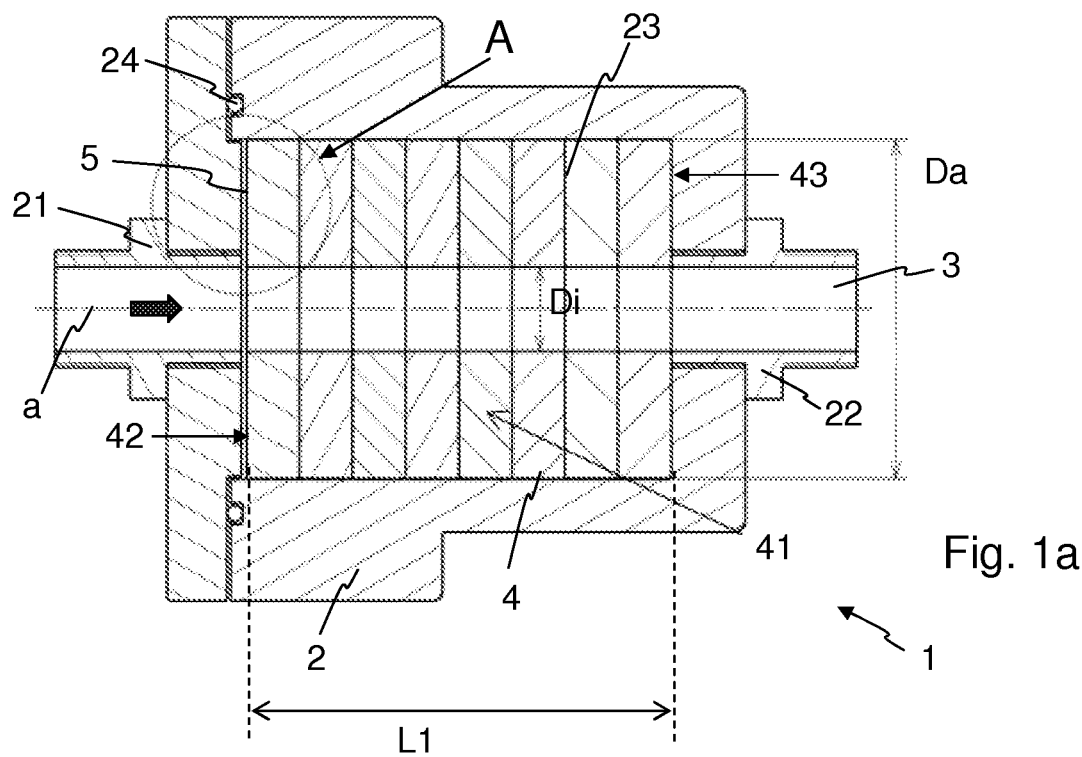
Figure 1B:
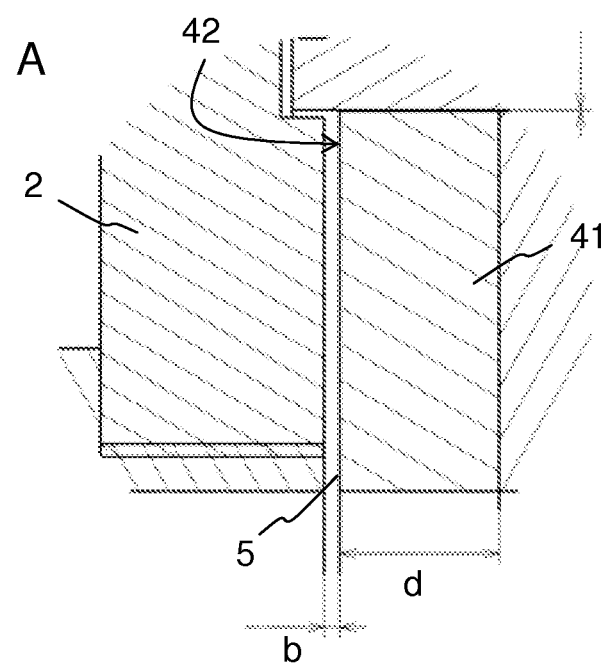
Figure 2:
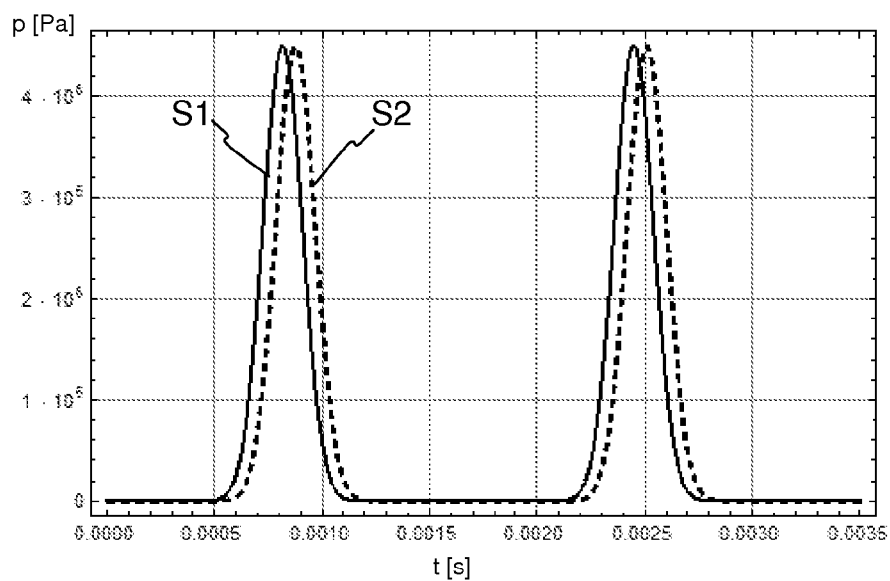
Figure 3A:
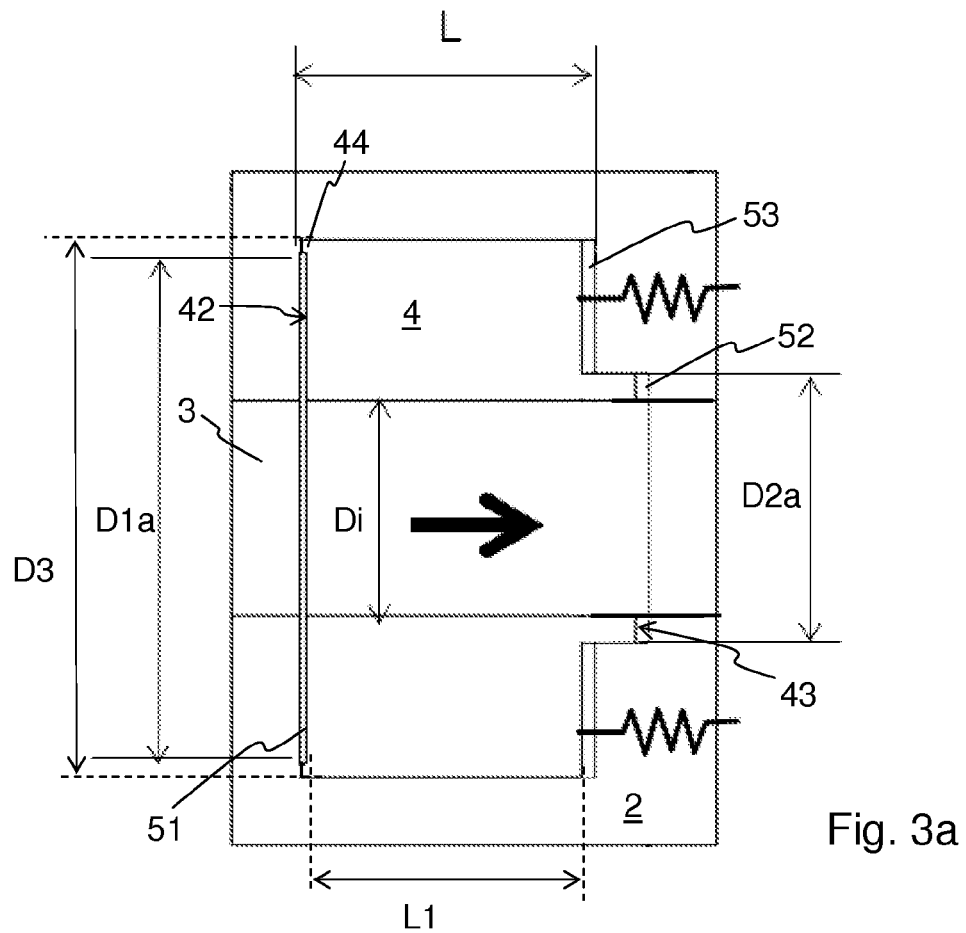
Figure 3B:
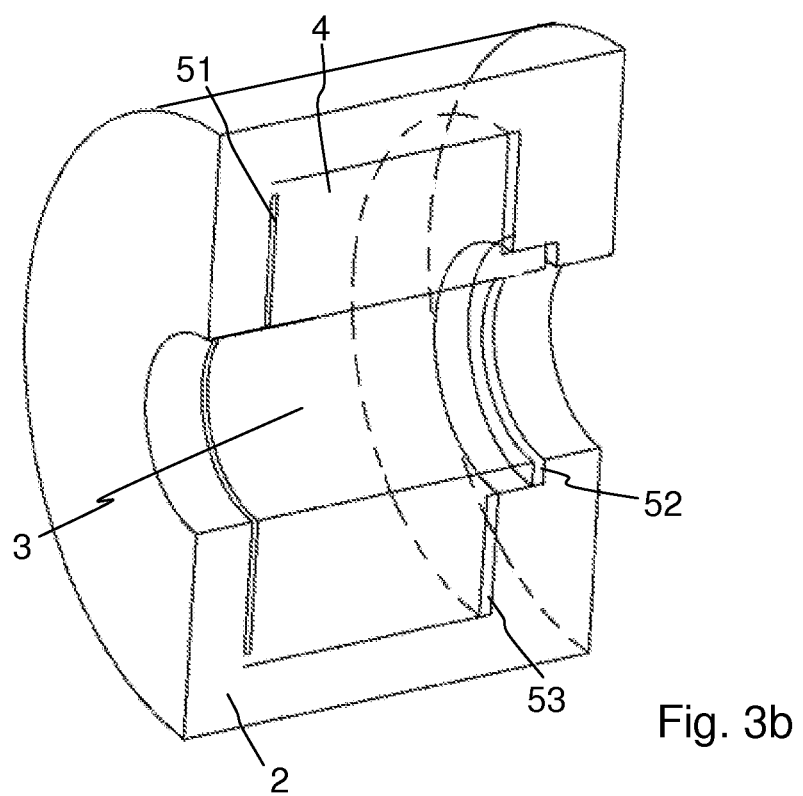

A person of skill in the art will expediently consider the features disclosed in combination in the drawings, the description and the claims also individually and combine them to other meaningful combinations. Schematically shown is in FIG. 1a a pulsation damper according to a first example of an embodiment in a sectional view;

FIG. 1b a section A of the pulsation damper according to FIG. 1a;

FIG. 2 chronological sequence of a pressure pulse with phase shifting between end face of the attenuator upstream and end face downstream;

FIG. 3a a pulsation damper according to a second example of an embodiment in a sectional view; and FIG. 3b a pulsation damper according to FIG. 3a in a perspective representation.

Identical components in the figures have the same reference numerals.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

In the following, the invention will be explained by taking as an example an engine oil circuit in a motor vehicle. The pulsation damper 1 is insertable downstream of an oil pump into the engine oil line. In this connection, the pressure peaks caused by the oil pump for supplying the engine oil have to be damped. However, the pulsation damper 1 is also suitable for other fluids and applications in which pressure pulsations occur which have to be damped.

FIG. 1a shows a pulsation damper 1 according to a first embodiment in a sectional view. The pulsation damper 1 features a housing 2 rotationally symmetric around an axis "a" which is insertable as intermediate piece into a fluid-guiding line. In this connection, the connecting pieces 21, 22 of the fluid-guiding line feature the same internal diameter as the fluid-guiding line. The housing 2 is metallic, for example made of aluminum. In the housing 2 is formed a hollow space 23. The hollow space 23 is of cylindrical design.

An attenuator 4, which features a plurality of segments 41, is disposed in the hollow space 23. There are eight segments 41 in this example of an embodiment. In other embodiments, however, another number of segments 41 may be provided for the multi-segmented attenuator 4. The segments 41 of the attenuator 4 are each disk-shaped and have all the same external diameter Da and the same internal diameter Di. The thickness "d", which means the dimension in axial direction, is also preferably identical. The segments 41 complement each other to form an attenuator 4 with the length L1. The segments 41 are made of a material with high density, in particular of a metal, for example steel or aluminum.

In conjunction with the connecting pieces 21, 22, the attenuator 4 forms a flow channel 3 for the fluid. The flow channel 3 extends along a central axis of the attenuator 4 which is equal to the axis "a" of the housing 2. The housing 2 surrounds the attenuator 4 and the flow channel 3 coaxially. The flow direction of the fluid is indicated by an arrow.

The internal diameter Di of the cylindrical attenuator 4 is constant and corresponds to the internal diameter of the connecting pieces 21, 22 and the fluid-guiding line. Because of this, the flow-guiding cross-sections remain constant so that no pressure loss is caused in the fluid-guiding line by the pulsation damper 1.

The external diameter Da of the cylindrical attenuator 4 corresponds substantially to the diameter of the hollow space 23. The attenuator 4 is fit with smallest possible clearance in radial direction into the housing 2. Because of this, a movement of the attenuator 4 in axial direction is possible, however, no bypass for the fluid is created. The fluid flows exclusively through the flow channel 3 from one location upstream of the attenuator 4 to a location downstream of the attenuator 4.

The hollow space 23 has, for example, a length between 20 and 100 mm, for example approx. 50 mm, and a diameter between 20 and 60 mm, for example approx. 40 mm. The damping effect depends on the length and diameter of the hollow space.

The attenuator 4 features in axial direction an upstream directed end face 42 and a downstream directed end face 43 which face each a wall of the housing 2 defining the hollow space 23. The end faces 42, 43 are orthogonal with regard to the central axis a of the flow channel 3. In the shown snapshot, the downstream directed end face 43 of the attenuator 4 abuts the wall of the housing 2. Between the upstream directed end face 42 and the wall of the housing 2, a gap 5 is generated with a clearance b, as in FIG. 1b, which shows the section A from FIG. 1a in detail.

The fluid can penetrate into the gap 5. The clearance b has to be chosen depending on the dimensioning of the elements of the pulsation damper 1 and its performance. The clearance b has to be chosen so small that the flow through the gap 5 is not impaired and that no important pressure loss is caused by flow deflection. On the other hand, the clearance b has to be chosen sufficiently large to ensure that the pressure of the fluid on the end face 42 can have an effect. Preferably, the clearance b continues to exceed a moving path of the attenuator 4. The moving path means the distance by which the attenuator is moved in case of a pressure differential at both end faces 42, 43. As a result, the attenuator 4 is movable into the hollow space 23 without the end faces 42, 43 abutting against the walls of the housing 2. Because of this it is ensured that a sufficiently long distance for an axial displacement is available for the attenuator 4, i.e. that the displacement caused by the pressure pulses is not impaired by abutting. Preferably, the clearance b amounts to a multiple, for example ten times more, of the moving path of the attenuator 4. With an average displacement of the attenuator 4 by 0.1 mm, the clearance is, for example, b=1 mm.

The housing 2 is multi-part. The gap existing between the housing components is sealed with a sealing element 24 so that no fluid can escape. The sealing element 24 is not required if the housing components are fluid-tightly connected otherwise with each other.

Due to the concentric assembly of flow channel, attenuator 4, and housing 2, a radial balance of forces is caused so that the pulsation damper 1 works virtually free of wear.

The mode of action of the pulsation damper will now be explained by means of an example. With a pump speed of 5000 revolution per minute and a system pressure of 3 bar, an exemplary pressure pattern of an engine-oil delivering vane pump features pressure pulsations with a period of approx. 575 Hz and an amplitude of approx. 40 bar. The pressure pulsations propagate with sound velocity in the corresponding fluid. As a result, at two locations spaced apart from each other in the fluid line, different pressure levels exist at a specific time. With the dynamic pulsation damper according to the invention, this is utilized to realize a damping of the pressure peaks.

FIG. 2 shows an exemplary pressure-time diagram without damping. The two curves represent the pressure pattern at different locations in the flow channel 3. The pressure pattern at the upstream directed end face 42 is represented by a solid line S1 and the pressure pattern at the downstream directed end face 43 by a dotted line S2. The two end faces 42, 43 of the attenuator 4 are spaced apart from each other by a distance L1=80 mm which corresponds to the extension of the attenuator 4 in axial direction.

Due to the pressure pulsations, a time-varying compressive force acts on the end faces 42, 43 of the attenuator 4. A pulse occurs at the downstream directed end face 43 approximately 0.1 ms later than at the upstream directed end face 42. At the time of the pressure maximum with approximately 45 bar at the first location, a pressure of approx. 35 bar exists at the second location. The pressure differential between the two locations in relation to the pressure maximum amounts to approximately 22% without taking into consideration the actual damping.

Due to the existing pressure difference at a specific time, different forces act on both end faces 42, 43. This results in a displacement of the attenuator 4 in axial direction in flow direction. After the displacement by a specified distance in flow direction, the attenuator 4 is moved back into the initial position, allowing again a damping effect on the subsequent pressure pulse. To realize an optimal damping effect, the dimensions of attenuator and hollow space as well as of the mass of the attenuator 4 are adapted to each other in such a way that a displacement of the attenuator 4 in flow direction and a displacement back into the initial position can be realized in the time between two consecutive pressure pulses.

FIG. 3a shows a pulsation damper 1 with a single-segment attenuator 4 in a schematic sectional view. FIG. 3b shows a perspective representation of the pulsation damper 1 of FIG. 3a in the same section plane. Housing 2 and attenuator 4 form a flow channel 3 for the fluid with a constant internal diameter Di.

Between the upstream directed end face 42 and the wall of the hollow space 23, a gap 51 is generated in the shape of an annular gap with a first external diameter D1a. The gap width of the gap 51 is predefined by a spacer 44 at the attenuator 4. If the attenuator 4 is moved in axial upstream direction, the spacer 44 ensures that a gap 51 with a minimum gap width defined by the height of the spacer 44 remains between the up-stream directed end face 42 and the wall of the housing 2. This ensures that a pressure pulse can act on the end face 42 and exert a force thereon. As an alternative, the spacer 44 can also be attached to the housing 2 or be a part of the wall.

The hollow space 23 features a step in upstream direction. Because of this, two cylindrical sections with different diameters are generated. The outer contour of the attenuator 4 is correspondingly adapted so that the smallest possible clearance exists. The first section of the hollow space 23 and of the attenuator 4 have an external diameter D3 which is slightly larger than the first external diameter D1a of the gap 51 at the upstream directed end face 42. The second section of the hollow space 23 disposed downstream of the first section and the second section of the attenuator 4 have a second external diameter D2a. The second external diameter D2a is smaller than the external diameter D3. Due to the step, two gaps 52, 53 downstream of the attenuator 4 are generated between the attenuator 4 and the wall defining the hollow space 23. The first gap 53 with the larger external diameter D3 is not in communicating connection with the fluid. The second gap 52 with the smaller external diameter D2a communicates with the flow channel 3, i.e. the pressure of the fluid acts only on the end face 43 of the second section of the attenuator 4. Thus, the downstream directed end plate 43 of the attenuator 4 is smaller than the upstream directed end face 42 of the attenuator 4.

The different external diameters D1a and D2a or the different effective end faces 42, 43 of the attenuator 4 achieve an improved damping. As a result, the length L of the hollow space 23 can be reduced in relation to the embodiment according to FIG. 1 with the same external diameter of the gap upstream and downstream of the attenuator 4 in order to obtain the same damping.

In order to ensure with a reduced cross-sectional area of the downstream directed end face 43 that a reset force acts on the attenuator 4, which is sufficient to move the attenuator 4 after an axial displacement in downstream direction again into the initial position in upstream direction, a schematically represented spring-loaded element 6 is provided. The spring-loaded element 6 is disposed in the gap 53 between the first section of the attenuator 4 and the housing 2. The spring-loaded element 6 is, for example, a compression spring.

The spring-loaded element 6 pushes the attenuator 4 under pretension in axial up-stream direction against the wall defining the hollow space 23. However, a gap 51 still exists due to the spacer 44. The axial displacement of the attenuator 4 in flow direction during the occurrence of a pressure pulse is realized against spring force so that a corresponding reset force leads the attenuator 4 to be moved back into its initial position after the pressure-induced displacement. The spring constant of the spring-loaded element 6 is preferably relatively weak and only so strong that the spring force is just sufficient to move the attenuator 4 back into its initial position. The spring constant can be adapted to the system in order to obtain the desired damping.

Among others, the following variants not shown of the pulsation damper according to the invention are conceived.

A spacer for specifying a minimum gap width of the gap 5 can also be provided in the variant of the pulsation damper represented in FIG. 1a.

Instead of a cylindrical shape, the hollow space and the attenuator can have any other shapes. Due to the radial balance of forces with a corresponding arrangement relative to the axis of flow, in particular other rotation-symmetric or axis-symmetric shapes are of advantage, for example a cuboid-shaped design. However, the shape of hollow space and attenuator can also be asymmetric. It is, furthermore, not necessary that the hollow space surrounds the flow channel coaxially. The hollow space can surround the flow channel only partially.

The spring-loaded element can also be a resilient element. The spring-loaded or resilient element can also be integrated into the attenuator. For this purpose, the attenuator can be realized sectionwise, in particular in the area of the downstream directed end face, of a resilient, in particular spring-loaded, material. Even in an embodiment with the same external diameters of the gap it is possible to provide a spring-loaded or resilient element. Furthermore, a variant only with spacer without resilient element or only with resilient element without spacer is possible.

The housing of the pulsation damper can also be made of synthetic material. The housing can furthermore be made in one-piece. The connecting elements can also be realized in one-piece with the other housings.

It is furthermore conceivable to introduce two or more pulsation dampers in series into the oil-circulation system so that the oil flows successively through several pulsation dampers. This is in particular of advantage if the mounting space available for a pulsation damper is limited, however, if there is still enough mounting space at another location. For example, instead of one long pulsation damper it is possible to use two shorter pulsation dampers The at least one pulsation damper can be advantageously integrated into an oil module of an oil-circulation system of an internal combustion engine. In many cases, oil modules combine several functions, for example filtration, oil pressure regulation, and cooling. An oil module comprises at least one filter element for oil filtration, which is introduced into a pressure- and temperature-resistant housing. In general, the housing is made of steel or aluminum and connectable with the engine. The pulsation damper is advantageously introduced into the fluid-guiding line before the filter element. By integrating the pulsation damper into the oil module, a separate mounting of the pulsation damper is not required which saves assembly time and costs. The pulsation damper can be introduced either completely or partially into the housing of the oil module.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A pulsation damper for damping fluid pressure pulsations of a fluid in a fluid line, comprising:
    a housing enclosing and defining at least one hollow space therein, the housing having
        an inlet port on an upstream axial side of the housing; and
        an outlet port on an opposing downstream axial side of the housing;
    at least one disk shaped attenuator member arranged within the at least one hollow space of the housing, the at least one disk shaped attenuator member having a flow opening extending completely through from an upstream end face of the at least one disk shaped attenuator member to a downstream end face of the at least one disk shaped attenuator member;
    wherein the at least one disk shaped attenuator member has radially outer contour which substantially corresponds to adjacent inner contour of the hollow space in the housing such that fluid is confined to flow substantially exclusively through the flow opening of the at least one disk shaped attenuator member, preventing bypass of fluid flow around the outer contour of the at least one disk shaped attenuator member;
    wherein the at least one attenuator member is disposed movably in axial direction within the at least one hollow space;
    wherein an axial straight line continuous flow channel is formed from the axial inlet port continuing through the at least one disk shaped attenuator member flow opening and continuing to the outlet port, wherein the fluid flows substantially exclusively through the continuous straight line flow channel from the inlet port to the outlet port;

wherein the at least one attenuator member flow opening defines a portion of the axial straight line continuous flow channel.

2. The pulsation damper according to claim 1, wherein the housing is at least sectionwise cylindrical;
wherein the at least one attenuator member has an external diameter is at least sectionwise substantially equal to a diameter of the hollow space of the housing.

3. The pulsation damper according to claim 1, wherein the flow channel is enclosed coaxially by the housing hollow space and the at least one attenuator member.

4. The pulsation damper according to claim 1, wherein interior walls of the at least one attenuator member form a portion of a circumferential flow channel wall over a length of the axial flow channel;
wherein the axial flow channel has a cross sectional area along its length that is substantially constant.

5. The pulsation damper according to claim 1, wherein the at least one attenuator member is of a high density metallic material.

6. The pulsation damper according to claim 1, further comprising
a resilient element operable to exert an axial force on the at least one attenuator member in an axial upstream direction relative to fluid flow in the flow channel;
wherein the resilient element is a spring-loaded element.

7. The pulsation damper according to claim 1, further comprising
a spacer arranged in the housing between the at least one attenuator member and an interior wall of the housing, the spacer ensuring that a gap between the at least one attenuator member and the interior wall limiting the hollow space in axial upstream direction is observed.

8. The pulsation damper according to claim 1, wherein
the hollow space has a first section along an axial length of the hollow space having a first external diameter;
wherein the hollow space has a second section along an axial length of the hollow space having a second external diameter, the second external diameter smaller than the first external diameter;
wherein the second section is disposed downstream of the first section.

9. The pulsation damper according to claim 1, wherein
a gap generated between an upstream face the at least one attenuator and interior housing wall area defining a first section of the hollow space in axial direction is substantially equal to a width of a gap generated between a downstream face of the at least one attenuator and an interior housing wall area defining a second section of the hollow space in axial direction.

10. The pulsation damper according to claim 1, wherein
the at least one attenuator member is at least two attenuator members arranged face to face, one after the other in the axial direction of the flow channel within the at least one hollow space.

11. A method of damping pressure pulsations of a fluid flowing in a fluid line, comprising:
providing a pulsation dampener according to claim 1, including at least one attenuator member disposed movably in axial direction within a hollow space of a housing;
transforming hydraulic energy of pressure pulsations in the fluid into kinetic energy of the at least one attenuator;
converting the kinetic energy of the at least one attenuator into dissipation energy.

* * * * *